United States Patent [19]

Kurtzberg et al.

[11] Patent Number: 6,073,240
[45] Date of Patent: *Jun. 6, 2000

[54] METHOD AND APPARATUS FOR REALIZING COMPUTER SECURITY

[75] Inventors: Jerome M. Kurtzberg; Menachem Levanoni, both of Yorktown Heights, N.Y.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/959,048

[22] Filed: Oct. 28, 1997

[51] Int. Cl.$^7$ .................................................. C06F 11/00
[52] U.S. Cl. ............................................ 713/200; 380/23
[58] Field of Search ................................... 713/200, 201, 713/202; 380/3, 4, 23, 25; 364/286.5, 286.4, 280; 340/825.34, 825.31; 714/39, 47

[56] References Cited

U.S. PATENT DOCUMENTS

| | | | |
|---|---|---|---|
| 4,916,738 | 4/1990 | Chandra et al. | 380/25 |
| 4,962,449 | 10/1990 | Schlesinger | 365/200 |
| 5,233,658 | 8/1993 | Bianco et al. | 380/25 |
| 5,265,221 | 11/1993 | Miller | 395/725 |
| 5,287,519 | 2/1994 | Dayan et al. | 395/700 |
| 5,388,211 | 2/1995 | Hornbuckle | 395/200 |
| 5,483,596 | 1/1996 | Rosenow et al. | 380/25 |
| 5,724,423 | 3/1998 | Khello | 380/23 |
| 5,724,426 | 3/1998 | Rosenow et al. | 380/25 |
| 5,848,232 | 12/1998 | Lermuzeaux et al. | 395/187.01 |
| 5,881,225 | 3/1999 | Worth | 395/186 |

OTHER PUBLICATIONS

Giuri et al., A role-based secure database design tool, Computer security foundation workshop, Proceed. of the sixth annual, pp. 203–212, Jul. 1996.

Peri et al., Formal specification of information flow security policies and their enforcement in security critical systems, Computer security foundation workshop, 1994 CSFW 7 Proceed., pp. 118–125, Jun. 1994.

Mao et al., Development of authentication protocols: some misconceptions and a new approach, Computer security foundation workshop, 1994 Proceed., pp. 178–186, Jun. 1994.

Williams et al., Automated support for external consistency, Computer security applications conference, 1994 Proceeds., pp. 71–81, May 1993.

Garfinkel et al., Book: Practical UNIX Security, pp. 125–130, Jun. 1991.

*Primary Examiner*—Nadeem Iqbal
*Attorney, Agent, or Firm*—McGinn & Gibb, P.C.; Stephen C. Kaufman, Esq.

[57] ABSTRACT

A method suitable for realizing computer security. The method includes the steps of establishing an authorization window for enabling computer system actions consistent with an authorization rule; and, monitoring the actions as an indicia of conformance to the authorization rule. The method preferably provides a pattern of system actions as an indicia of compliance with an authorization rule, and provides notification of predetermined patterns.

18 Claims, 5 Drawing Sheets

METHOD AND APPARATUS FOR REALIZING COMPUTER SECURITY

FIELD OF THE INVENTION

This invention relates to a method and apparatus for realizing computer security.

BACKGROUND OF THE INVENTION

Computer security structures are currently maintained in a computer's operating system. The operating system can determine, according to files which it contains, which user is authorized to gain access to the operating system, which legal user is authorized to gain access to specific files, and/or which legal user can be authorized to modify existing files.

SUMMARY OF THE INVENTION

Our work centers on an analysis of the purview and deficiencies of current computer security structures and functionality. In this regard, we have discerned that computer security is frequently breached by intruders taking advantage of errors in the operating system code, which can show up at specific times, the intruders thereby improperly gaining access for enabling computer system actions. Additionally, intruders sometimes simply bypass an authorization phase, so that they can again improperly gain access for enabling computer system actions. Moreover, current computer security systems have an ill-advised exposure, in the sense that after files are accessed and/or modified, no further check or analysis of legitimacy of actions can be invoked or performed.

We have now discovered novel methodology and apparatus which can advantageously extend the purview of existing computer security structures, while at the same time ameliorating or removing the noted deficiencies and ill-advised exposures of current computer security structures.

The novel method comprises the steps of:

1) establishing an authorization window for enabling computer system actions consistent with an authorization rule; and
2) monitoring said actions as an indicia of conformance to the authorization rule.

The novel apparatus comprises:

1) means for establishing an authorization window for enabling system actions consistent with an authorization rule; and
2) means for monitoring the actions as an indicia of conformance to the authorization rule.

BRIEF DESCRIPTION OF THE DRAWING

The invention is illustrated in the accompanying drawing, in which.

DETAILED DESCRIPTION OF THE INVENTION

The detailed description proceeds by first setting forth preferred aspects of the invention, as summarized above, and then disclosing preferred structural and functional aspects of the invention.

The invention can use conventional techniques for establishing an authorization window for enabling computer system actions consistent with an authorization rule. In particular, the authorization window can be established for one or a plurality of users. The authorization window can be established in accordance with a time schedule, or alternatively, in accordance with pre-selected system actions.

The invention can use conventional techniques for monitoring the computer actions as an indicia of conformance to an authorization rule. In particular, the monitoring can be done at random times, or predetermined times, or continuously, as well as during or after an authorization window.

The description of the structure proceeds with reference to FIGS. 1–5 (numerals 10–18, respectively).

A history file which logs all transactions on all files is maintained. It includes the user (ID), action on the file (access only, modification etc.,) and time of said action, but is not limited to these examples. Secondly, there is a search engine whose function is to analyze and evaluate such actions on all files (data and program files). This action can take place periodically, randomly, or only at certain specified times (e.g., off shift hours).

The evaluation and analysis determine if the user that accessed or modified a particular file is authorized to do so. The security manager can request the search engine to provide a list of users (even legal users) who have accessed or modified a file at least N-times in a given time period. Such analysis can provide a pattern of file manipulations for evaluation of possible violations. The search engine is not limited to such activities as described in this illustration.

The search engine resides in the operating system. The historical log information can reside as part of file headers (and stored with the file) or they can be grouped together and stored in the operating system memory domain.

The operation of the search engine when being executed preferably proceeds as follows:

The specific security command to be executed (e.g., determine if all users accessing a given file between times T1 and T2, are legal) will go into the historical log file. Extract the name of each user within the time period, and check the authorization with the master file contained in the operating system. All illegal users are noted, and alarm may be sent to the security manager.

Another-example is the determination of all users (legal or illegal) who accessed or modified a specific file between specific times. Again, a report may be sent to the security manager.

Figure 1:
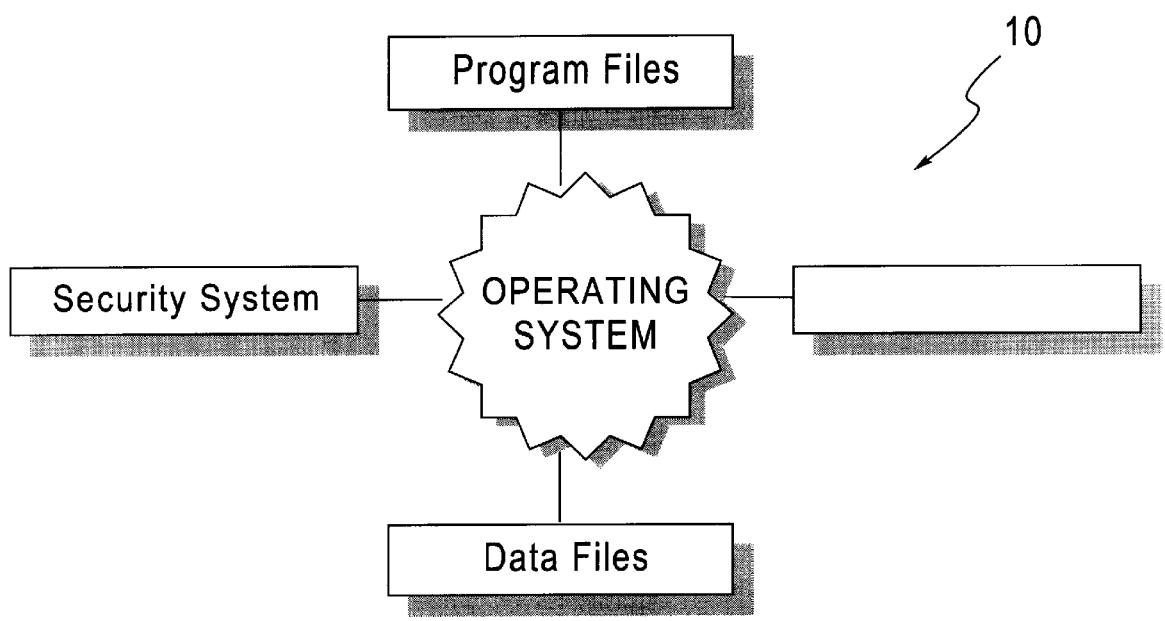
FIG. 1 shows a security module in a computer system.
Figure 2:
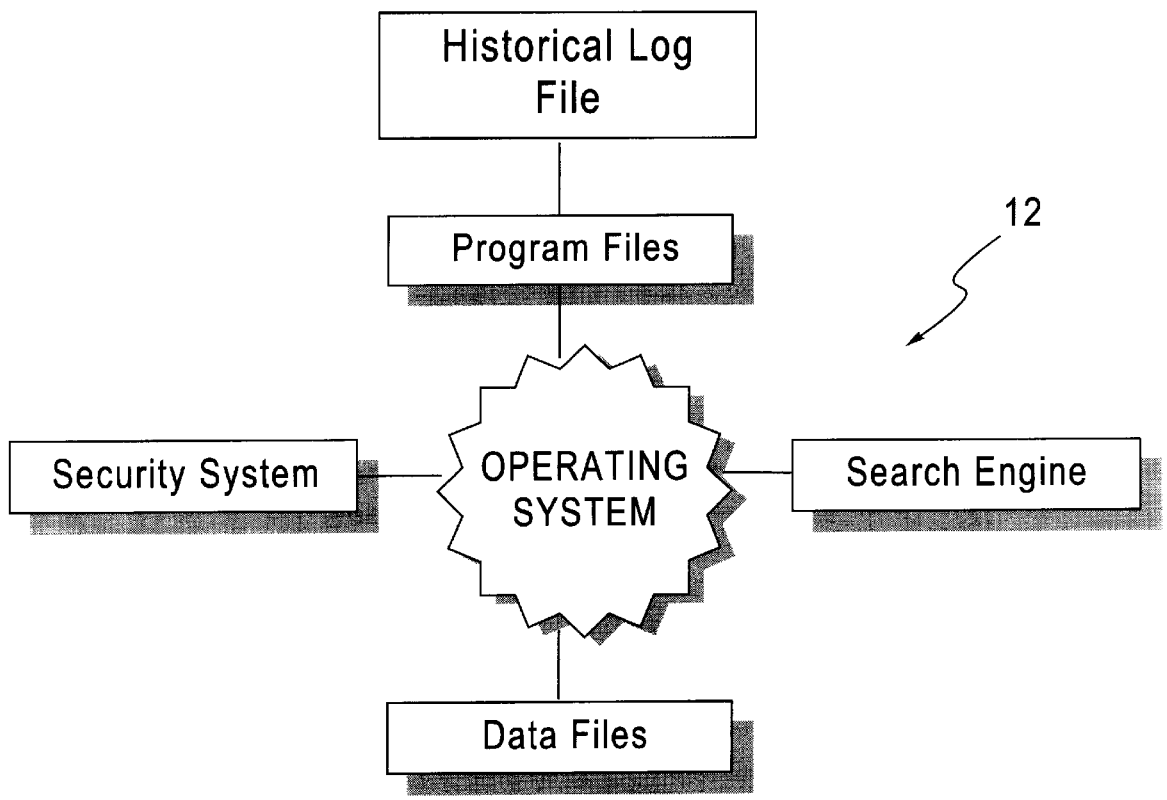
FIG. 2 shows a search engine embedded in an operating system together with an historical log file.
Figure 3:
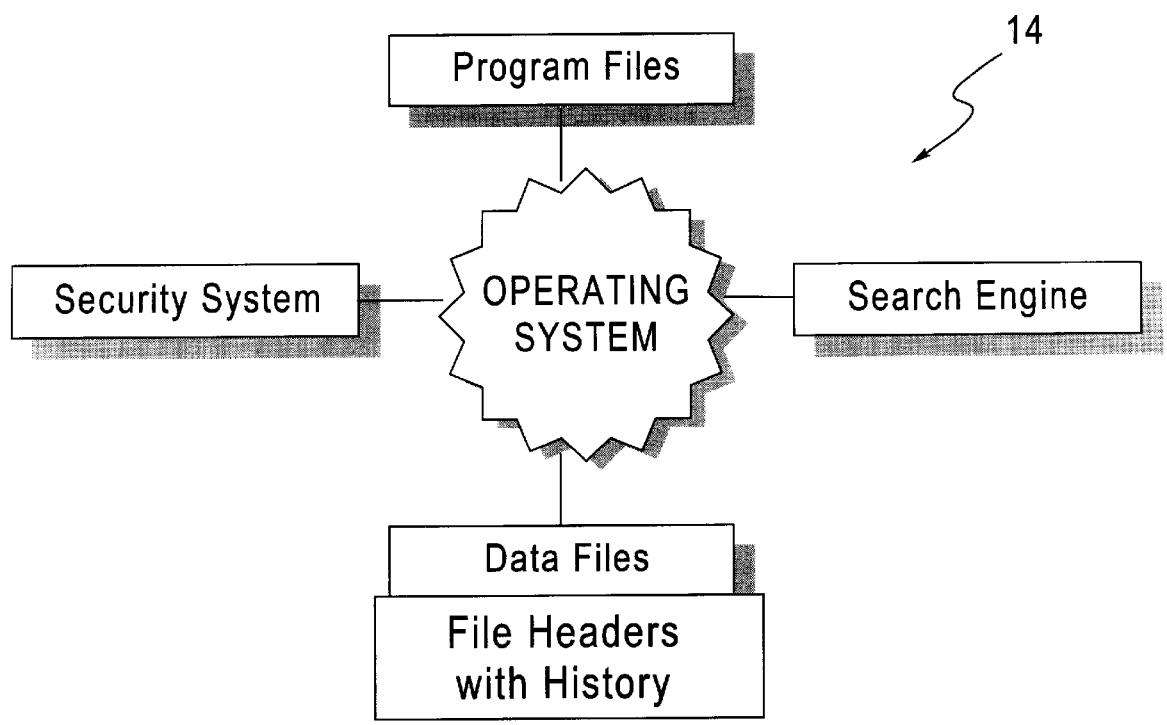
FIG. 3 shows a search engine embedded in an operating system with historical information embedded in file headers.
Figure 4:
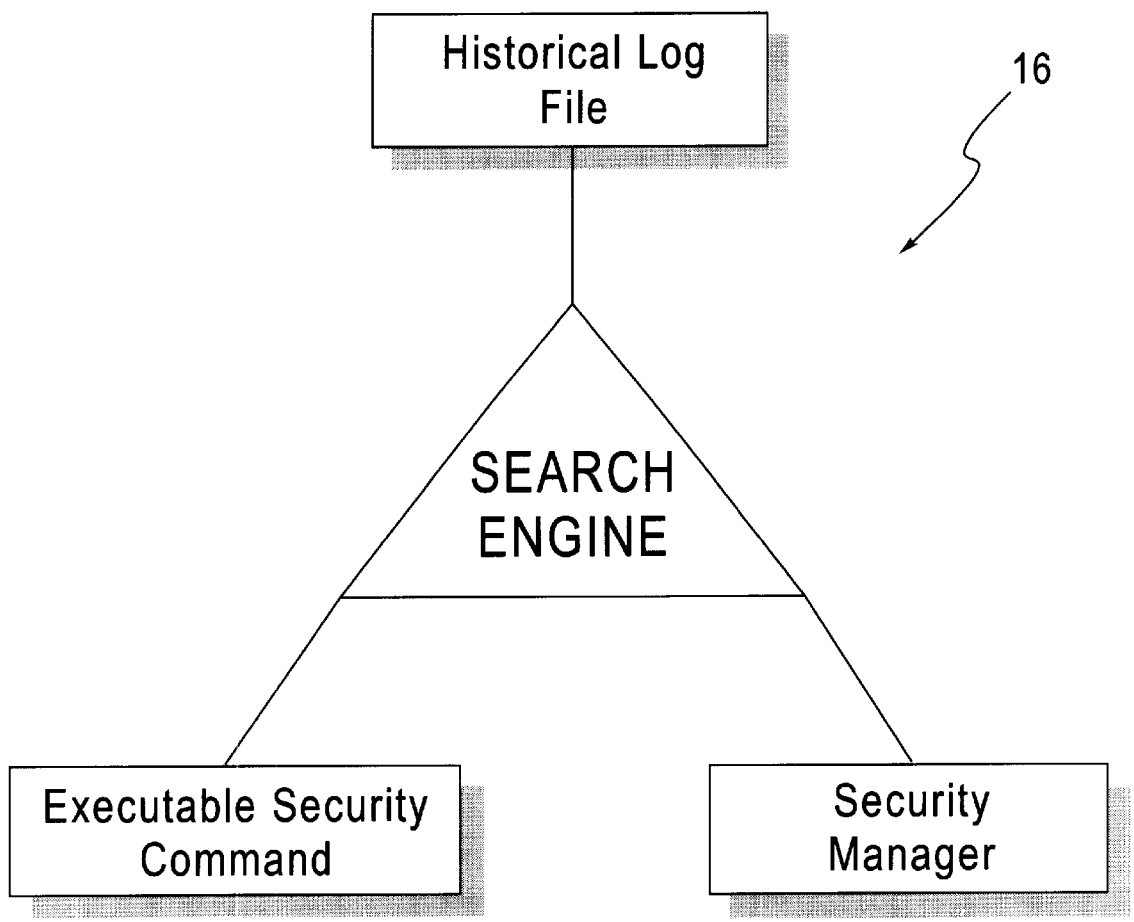
FIG. 4 shows a structure of a security system.
Figure 5:
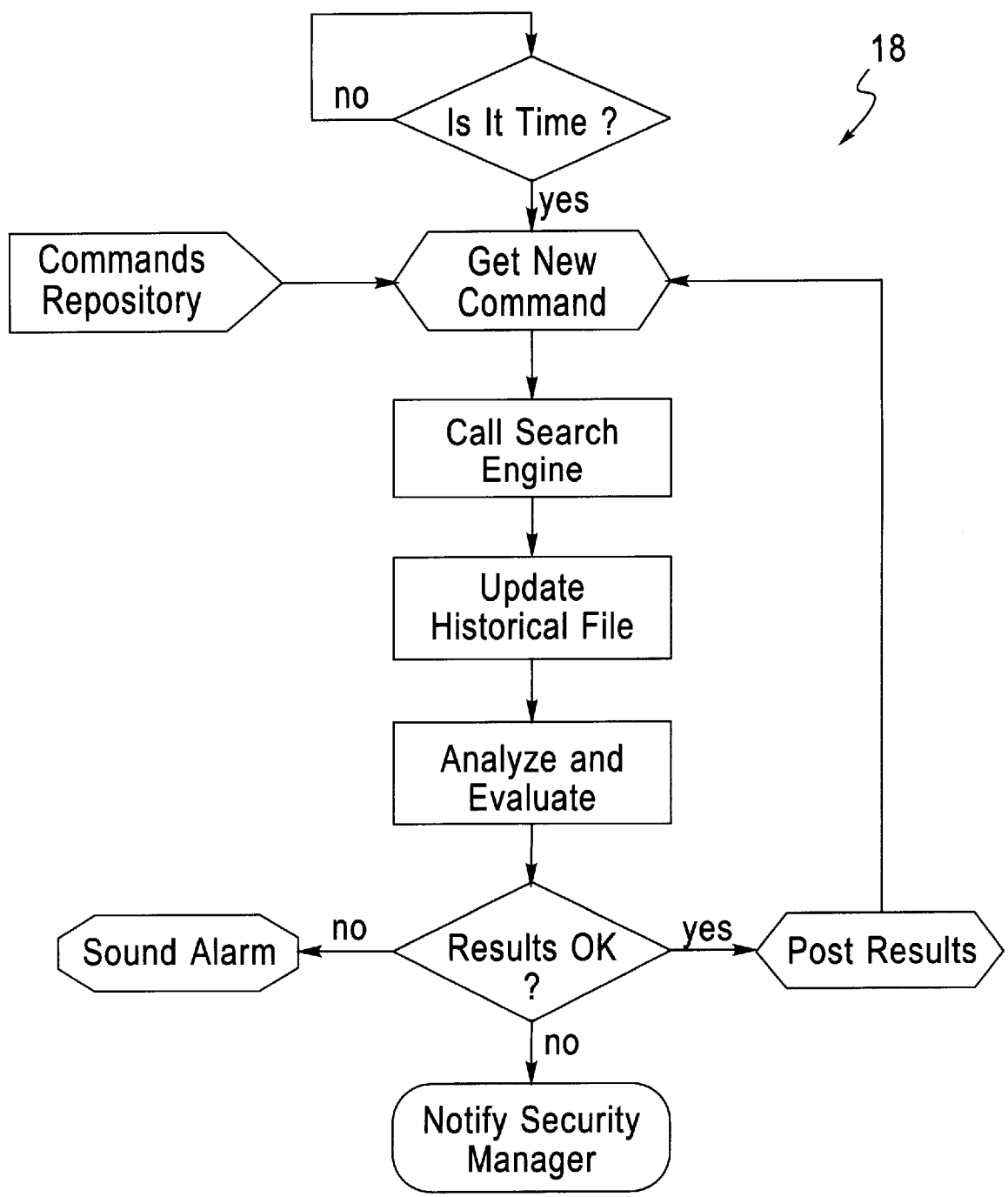
FIG. 5 provides a flowchart of operation of the FIG. 4 security system.

FIG. 5 shows a flowchart of the operation of this audit trail security system.

What is claimed is:

1. A method suitable for realizing computer security of a computer system, the method operable within a computer system and comprising:

(1) establishing an authorization window for enabling computer system actions consistent with an authorization rule;
(2) the computer system automatically and independently monitoring said actions as an indicia of conformance to said authorization rule after said authorization window closes; and
(3) while the computer system automatically and independently monitors said actions, the computer system automatically and independently determines whether said actions conform to said authorization rule.

2. A method according to claim 1, wherein step (1) comprises establishing the authorization window for a plurality of users.

3. A method according to claim 1, wherein step (1) comprises establishing the authorization window in accordance with a time schedule.

4. A method according to claim 1, wherein step (1) comprises establishing the authorization window in accordance with selected system actions.

5. A method according to claim 1, wherein step (2) comprises the computer system automatically and independently monitoring said actions at random times after said authorization window closes.

6. A method according to claim 1, wherein step (2) comprises the computer system automatically and independently monitoring said actions at predetermined times after said authorization window closes.

7. A method according to claim 1, wherein step (2) comprises the computer system automatically and independently monitoring said actions continuously after said authorization window closes.

8. A method according to claim 1, wherein step (2) comprises monitoring actions comprising file accessing.

9. A method according to claim 8, wherein step (2) comprises monitoring file modification.

10. A method according to claim 1, wherein step (2) comprises monitoring actions comprising program invocation.

11. A method according to claim 1, further comprising (4) providing a pattern of system actions based on the determination of whether said actions conform to said authorization rule.

12. A method according to claim 11, further comprising (5) providing notification of predetermined patterns.

13. Apparatus for realizing computer security of a computer system, comprising:

(1) means for establishing an authorization window for enabling computer system actions consistent with an authorization rule;

(2) means for the computer system to automatically and independently monitor said actions as an indicia of conformance to said authorization rule after said authorization window closes; and (3) means for the computer system to automatically and independently determine whether said actions conform to said authorization rule while the computer system automatically and independently monitors said actions.

14. An apparatus according to claim 13, wherein said actions comprise file accessing.

15. An apparatus according to claim 14, wherein said actions comprise file modification.

16. An apparatus according to claim 13, wherein said actions comprise program invocation.

17. An apparatus according to claim 13, further comprising means for providing a pattern of system actions based on the determination of whether said actions conform to said authorization rule.

18. An apparatus according to claim 17, further comprising means for providing notification of predetermined patterns.

* * * * *